Nov. 29, 1960  K. KUROSE  2,962,581
DIRIGIBLE HEADLIGHTS
Filed June 19, 1958

INVENTOR.
Keamon Kurose
BY
Fred C. Matheny
ATTORNEY

United States Patent Office 2,962,581
Patented Nov. 29, 1960

2,962,581
DIRIGIBLE HEADLIGHTS
Keamon Kurose, 7002 N. Mercer Way, Mercer Island, Wash.
Filed June 19, 1958, Ser. No. 743,079
1 Claim. (Cl. 240—8.25)

My invention relates to dirigible headlights for motor vehicles.

An object of my invention is to provide a dirigible headlight of simple and efficient construction by which a beam of light will be caused to move angularly in synchronism with the steering movement of the front wheels of a vehicle thereby keeping the beam of light always pointed in the same direction as the front vehicle wheels and making possible safer driving by always enabling the driver to see the area toward which his vehicle is moving.

Another object of my invention is to provide a dirigible headlight comprising a normally upright cylindrical outer shell or housing having at least the forwardly facing portion of its cylindrical wall formed of transparent material and having within said outer shell a cylindrical reflector rotatively mounted coaxially of the shell, said reflector being connected with the steering mechanism of the vehicle and having an upright light outlet slot or opening in its forwardly facing wall and said reflector and shell having a source of light disposed therein so that a beam of light will be directed outwardly through the light outlet opening in the reflector and will be caused to move angularly with the reflector.

Other objects of my invention will be apparent from the following description taken in connection with the accompanying drawings.

Like reference numerals refer to like parts throughout the several views.

Figure 8:
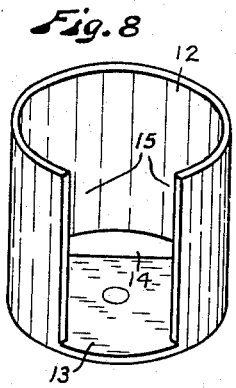
Fig. 8 is a detached perspective view of a rotative reflector embodied in my invention.
Figure 7:
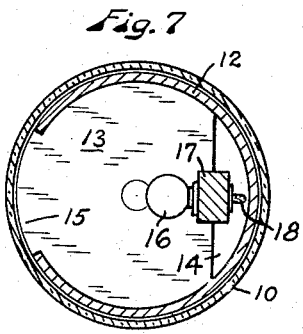
Fig. 7 is a cross sectional view, with parts in plan, taken substantially on broken line 7—7 of Fig. 6.
Figure 6:
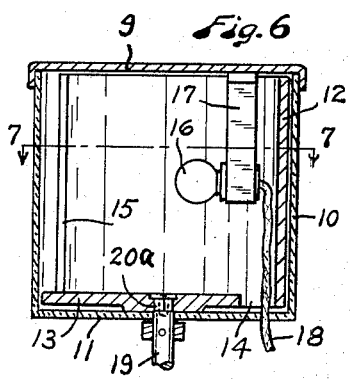
Fig. 6 is a view in medial vertical section, with parts in elevation, showing a dirigible headlight constructed in accordance with my invention.

Referring to Figs. 6, 7 and 8, my dirigible headlight comprises a normally upright cylindrical shell 10 having a fixed but preferably removable top or cover 9 and provided with a substantially tightly closed bottom wall 11. The forwardly facing portion of the shell 10 is formed of transparent material and serves as a lens through which light may pass outwardly. Preferably I construct this shell 10 of transparent plastic material so that the forwardly facing portion of the cylindrical wall is capable of transmitting light. Obviously the rearwardly facing portion of the cylindrical wall 10 and the cover 9 and bottom wall 11 can be opaque or can be coated with opaque or light reflective material.

A cylindrical reflector 12, of slightly smaller diameter than the shell 10 is rotatively disposed within said shell 10. The reflector 12 has a bottom wall 13 which may rest on the bottom 11 of the shell 10. The top end of the reflector 12 extends substantially to the cover 9 and it does not need to be closed. The bottom wall 13 of the reflector has an opening or slot 14 in its rearmost portion to afford clearance for one or more circuit wires 18 and to allow for angular movement of the reflector 12 without injury to the circuit wires 18. An upright light slot or opening 15 is provided in the forward cylindrical wall of the reflector 12. A lamp globe 16 is positioned in the central portion of the reflector 12 and shell 10 and is supported by a downwardly extending mounting member or bracket 17 which is rigid with the cover or top wall 9 of the shell. The lamp globe 16 is thus fixedly supported from the top 9 of the shell 10 and does not move angularly with the reflector 12. The circuit wires 18 are connected with this lamp globe 16 and extend downwardly through the opening 14 in the bottom of the reflector 12 and through a suitable small opening in the bottom 11 of the shell and are connected with the usual source of electrical energy. The reflector bottom 13 is securely attached to an upright post 19. This can be done by fitting a square upper end portion 20a of the post 19 into a correspondingly shaped hole in the bottom member 13 and securing these two parts together in any suitable manner.

Figure 1:
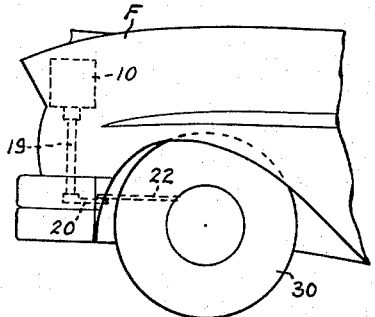
Figure 1 is a fragmentary view in side elevation of the front end portion of a motor vehicle, showing by dotted lines, my dirigible headlight installed thereon.
Figure 2:
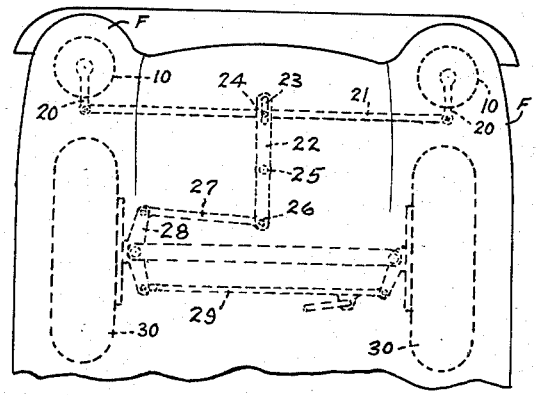
Fig. 2 is a similar fragmentary top plan view showing, by dotted lines, two of my dirigible headlights and showing operative means connecting these headlights with the steering mechanism of the vehicle.

Preferably my dirigible headlights are installed under the fenders F of a motor vehicle, as shown by broken lines in Figs. 1 and 2. The shells 10 are fixedly supported from the vehicle body or frame in any suitable manner and the forward extremities of the fenders F preferably extend over the headlights and curve downwardly in front of the same enough to insure that the beams of light will not be too high. The widths of the beams of light are limited by the width of the reflector slots 15.

One set of operative devices for angularly moving the reflectors 12 in synchronism with the steering movement of the front vehicle wheels is illustrated in Fig. 2 but obviously the mechanism used for this purpose can be varied in form. Fig. 2 shows the lower end portion of each upright post 19 to be connected by a link 20 with a cross bar 21. The cross bar 21 is connected with the forward end portion of a lever 22 by a slot 23 and pin 24. The lever 22 is fulcrumed on a fixed pivot member 25 and has its rear end connected by another pivot member 26 with one end of a bar 27. The other end of the bar 27 is pivotally connected with a lever arm 28 which moves angularly with the adjacent wheel 30 when steering movement is imparted to the vehicle wheels by movement of the usual steering rod 29. The several parts 20 to 28 inclusive are positioned and arranged so that they will angularly move the reflectors 12 synchronously with the wheels 30 and impart to each reflector the same amount of angular movement in the same direction that the front wheels are moved in steering the vehicle. The back and sides of the interior of the reflectors 12 are coated with or made of light reflecting material and it will be understood that the area defined by the light slot or opening 15 can be light conductive material instead of being entirely cut away.

Figure 4:
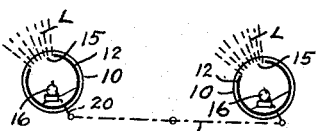
Fig. 4 is a view similar to Fig. 3 illustrating the light beams angularly directed to the left, as in a left turn.
Figure 3:
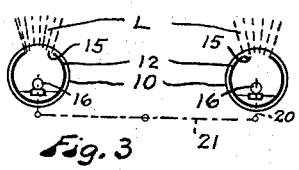
Fig. 3 is a diagrammatic plan view illustrating my dirigible headlights with the light beams directed straight ahead.
Figure 5:
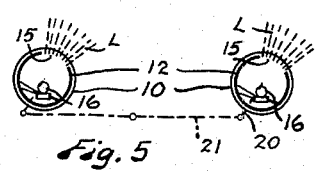
Fig. 5 is a view similar to Figs. 3 and 4 illustrating the light beams angularly directed to the right, as in a right turn.

Figs. 3, 4 and 5 illustrate diagrammatically the operation of my invention. When a vehicle equipped with my headlights is proceeding straight ahead the reflectors 12 and light beams they control will be directed straight ahead, as shown in Fig. 3. If the wheels 30 are turned left in making a left turn the reflectors 12 and light beams L they control will be angularly moved to the left, as shown in Fig. 4, through substantially the same angle as the wheels to illuminate the road and area directly in front of the wheels. Similarly if the front wheels 30 are turned to the right for a right turn the reflectors and light beams controlled thereby will be turned to the right, as shown in Fig. 5. The shells 10 do not move angularly with the reflectors.

The foregoing description and accompanying drawings clearly disclose a preferred embodiment of my invention but it will be understood that this disclosure is merely illustrative and that changes may be made within the scope of the following claim.

I claim:

A dirigible headlight for motor vehicles having front wheels and having steering devices capable of angularly moving said front wheels, comprising a normally upright outer cylindrical shell having a light transmitting forward portion; a flat shell bottom rigid with said cylindrical shell and closing the bottom end thereof; a top member rigid with said shell and covering the upper end thereof; a lamp supported from said top member and positioned in the medial portion of said shell and to the rear of the vertical axis of said shell; a cylindrical reflector of slightly smaller diameter than said shell rotatively disposed coaxially within said shell with the cylindrical wall of the reflector in close proximity to the cylindrical wall of the shell, said reflector having a vertically positioned light outlet slot positioned in registration with the light transmitting forward portion of said shell and extending from top to bottom of said reflector, the edges of said slot being straight; a bottom member rigid with the lower end portion of said reflector and resting on said shell bottom, said bottom member having a circuit wire access opening of substantial length extending across the rearmost portion thereof; at least one circuit wire connected with said lamp and extending through said access opening; a post secured to said reflector bottom axially of said reflector and extending downwardly therefrom; and reflector moving means connecting said post with the vehicle steering devices rotatively moving said reflector synchronously with the steering movement of the front vehicle wheels, whereby said reflector will project light forwardly in a direction substantially parallel to the planes of the wheels for all positions of said wheels.

References Cited in the file of this patent
UNITED STATES PATENTS

| | | |
|---|---|---|
| 1,311,951 | Crawford | Aug. 5, 1919 |
| 1,524,443 | McVey et al. | Jan. 27, 1925 |
| 1,582,087 | Schuler | Apr. 27, 1926 |
| 1,585,593 | McLaughlin | May 18, 1926 |
| 1,656,635 | Hill | Jan. 17, 1928 |
| 2,064,880 | Bostic | Dec. 22, 1936 |

FOREIGN PATENTS

| | | |
|---|---|---|
| 646,312 | France | July 10, 1928 |